US008348064B2

(12) United States Patent
Tandon

(10) Patent No.: US 8,348,064 B2
(45) Date of Patent: Jan. 8, 2013

(54) MULTI-CYCLONE SEDIMENT FILTER

(75) Inventor: Pradeep Kumar Tandon, Rydalmere (AU)

(73) Assignee: Waterco Limited, Sydney (AU)

( * ) Notice: Subject to any disclaimer, the term of this patent is extended or adjusted under 35 U.S.C. 154(b) by 356 days.

(21) Appl. No.: 12/665,299

(22) PCT Filed: Jun. 20, 2008

(86) PCT No.: PCT/IB2008/001633
§ 371 (c)(1), (2), (4) Date: May 3, 2010

(87) PCT Pub. No.: WO2008/155649
PCT Pub. Date: Dec. 24, 2008

(65) Prior Publication Data

US 2010/0213118 A1 Aug. 26, 2010

Related U.S. Application Data

(60) Provisional application No. 60/945,185, filed on Jun. 20, 2007.

(51) Int. Cl.
*B01D 35/06* (2006.01)

(52) U.S. Cl. ..................... 210/512.2; 209/711; 209/712; 209/728; 209/729; 55/459.1

(58) Field of Classification Search ............... 210/512.2; 209/711, 712, 728, 729; 55/459.1
See application file for complete search history.

(56) References Cited

U.S. PATENT DOCUMENTS 2,671,560 A 3/1954 Fontein et al.
2,734,630 A 2/1956 Van Der Wal
4,726,902 A 2/1988 Hubbard
4,793,925 A 12/1988 Duval et al.
4,823,731 A 4/1989 Howeth
(Continued)

FOREIGN PATENT DOCUMENTS

FR 2619498 2/1989
GB 667142 2/1952
GB 1090978 11/1967

OTHER PUBLICATIONS

The Written Opinion for the International Searching Authority for PCT/IB2008/001633, mailed on Oct. 29, 2008.*

*Primary Examiner* — David A Reifsnyder
(74) *Attorney, Agent, or Firm* — Craig M. Stainbrook; Stainbrook & Stainbrook, LLP

(57) ABSTRACT

A multi-cyclone sediment filter having a sediment bowl with a hemispherical bottom and a sump for collecting sediment, a cylindrical cyclone housing disposed above and sealingly connected to the sediment bowl, a removable and replaceable cyclone cartridge inserted into the cyclone housing, a diffuser plate sealingly connected to the cyclone cartridge and cyclone housing, a fluid inlet for introducing fluid into the cyclone housing, and a fluid outlet for discharging fluid from the cyclone housing. The cyclone cartridge inserted in the cyclone housing includes a plurality of vertically disposed inverted cone-shaped fluid cyclones, each having a small opening at a lower end and larger opening at an upper end. The cartridge has a plurality of fluid flow paths that direct fluid to the cyclones where a vortex is induced in the moving fluid. As sediment is removed from the fluid in each cyclone, it is separated out and delivered down into the sediment bowl sump, while fluid is directed upwardly and out to the fluid outlet.

10 Claims, 4 Drawing Sheets

U.S. PATENT DOCUMENTS 5,879,545 A 3/1999 Antoun
6,485,536 B1 11/2002 Masters
7,306,730 B2 12/2007 Tashiro et al.
2004/0149667 A1 8/2004 Meyer
2006/0230725 A1 10/2006 Han et al.
2006/0283788 A1 12/2006 Schreppel, Jr.

* cited by examiner

MULTI-CYCLONE SEDIMENT FILTER

BACKGROUND OF THE INVENTION

1. Technical Field

The present invention relates generally to cyclonic separators, more particularly to a multi cyclone separator and sediment filter for fluids, utilizing a plurality of cyclone apparatus arranged in a radial pattern to remove particulate debris from the fluid.

2. Background Art

Cyclonic separators are used for separating unwanted debris from fluids by using centrifugal force. The fluid is typically injected obliquely into the cyclonic separator elements such that a circular flow is set up. The centrifugal forces act on the debris, which is more dense than the fluid in which it is suspended, forcing the denser material outwardly and toward the perimeter of the separation chamber. The conical shape of the separator elements does not allow the denser material to exit the top of the inverted cone. Instead, the substantially debris-free fluid surrounding the center of the vortex is extracted and re-circulated, while the debris is collected and discarded.

Some cyclonic filters are used in a component system in combination with a separate filter housing and a separate sludge receiver housing. These component systems require regular cleaning and changing of several housings and filter bags. This increases apparatus down time and the amount of inventory needed to maintain the system in working order.

Cyclonic separation is commonly used in vacuum cleaners to remove fine and large debris from an air stream created by the vacuum. Air is injected tangentially into the cyclonic chamber and the resultant vortex spins and forces debris to the walls of the cyclonic chamber, while clean air exits the top of the vortex.

Cyclonic technology is also used in water treatment in oil production. Standard oilfield-produced water equipment includes, as examples, skim tanks, corrugated plate interceptor vessels, Wemco units, centrifuges and hydrocyclones. It has been recognized that all of these elements are all susceptible to changes in operational parameters. Units are designed for a certain flow rate, operating pressure, solids loading, and oil loading. Under the predefined parameters is able to treat produced waters effectively. Typically, however, the parameters do not remain constant. CETCO Offshore has designed the CRUDESEP® unit for the removal of oil, gas and solids, for example, either upstream or downstream of a three-phase separator. The principle of the CRUDESEP® is a vertical vessel operating at near-atmospheric pressure. [CRUDESEP is a registered trademark of AMCOL International Corporation of Arlington Heights, Ill.] Gravity oil separation is enhanced by induced gas flotation and swirling flow, where gas bubbles are injected midway up the vessel using eductors. Produced water is withdrawn from the system in the lower half of the unit and used to drive the eductors, the gas being taken from the top of the vessel. This is intended to eliminate cumbersome moving parts with swirling flow achieved by a series of tangential feed nozzles at the wall.

Other background systems of interest are documented in several patents, including U.S. Pat. No. 4,726,902 to Hubbard, which teaches a cyclone degritter that receives water inflow and directs the water through cyclone units with an underflow directed to a grit pot and an overflow of substantially purified water.

U.S. Pat. No. 7,306,730 Tashiro et al, describes a cyclone-type separator for separating solid particles from liquid. The apparatus comprises a hollow cylindrical body with inlet and discharge ports. The main body causes liquid to swirl or eddy in the main body, and the foreign matter contained in the liquid is separated by centrifugal force as the liquid swirls. The foreign matter falls along an inner surface of the main body and is discharged through the discharge port. Clean liquid is discharged from the discharge port. Tashiro et al show the introduction of fluid into the side of a single cyclone.

U.S. Pat. No. 4,793,925 to Duval et shows a single element separator which includes a body with an inlet and outlet that induces a vortex in fluid by driving it into an inverted conical chamber. Solid particulate materials fall out of a port in the bottom of the cone. In many respects, this is difficult to distinguish over Tashiro et al.

U.S. Pat. Appl. Ser. No. 2004/0149667 by Meyer show another version of kind of apparatus taught by Tashiro et al and Duval et al.

U.S. Pat. Appl. Ser. No. 2006/0283788 by Schreppel, Jr., teaches a three stage separator in which swirl chambers and aeration produces bubble formation and collapse that creates localized high pressure. In a first stage the liquid passes through a swirl chamber and rotating flow is dispersed to oxide and mix it. The swirl chamber includes a spiral passageway for the centrifugal flow of the influent material to be dispersed outwardly from the chamber. The swirl chamber typically includes a top cover and a bottom cover substantially closing the cylinder except for a central opening in the top cover for release of lighter materials and a central opening in the bottom cover for the heavy contaminants.

Other patents of interest include U.S. Pat. No. 4,823,731 to Howeth, which describes an electrostatic dry powder coating spraying system has a multi-color powder coating recovery system comprising a plurality of vertically extending cyclonic filter barrels laterally spaced about a central vertical axis and having vertically aligned upper ends. A single filter cleaning apparatus, including a filter back flushing system, is adapted to rest upon and operatively engage any selected one of such upper barrel ends, and is operative to back flush the filter within the barrel upon which it rests. Oversprayed powder from the spraying system is reclaimed by drawing it through the “active” filter barrel to which the filter cleaning apparatus is connected.

U.S. Pat. No. 5,879,545, to Antoun, describes a compact cyclonic filter assembly used for separating unwanted debris from a fluid. The cyclonic filter assembly uses the centrifugal forces to separate large pieces of debris from the fluid and a filter to separate the remaining unwanted debris from the fluid. The invention can be contained in a compact single housing which may be disassembled for easy cleaning and replacement of parts. The cyclonic filter assembly has a vertically oriented cylindrical tube which receives a tangential injection of the debris laden fluid. The tangential injection causes the fluid to circulate around a cylindrical vortex finder which is inside of and coaxial with the tube. The centrifugal forces acting on the debris causes the debris to move outward away from the center of the vortex. The vortex finder has an opening which pulls in the relatively clean fluid near the center of the vortex while the debris laden fluid settles into a collection chamber below the cylindrical tube. The invention has a filtration chamber housing a filter element which is used to extract the remaining unwanted debris from the fluid before it exits the cyclonic filter assembly.

U.S. Pat. No. 6,485,536 to Masters describes a particle separator which separates entrained particulates from a fluid. The particle separator utilizes an auger enclosed within a cylinder to form a cyclonic chamber, through which air is propelled. The centrifugal motion of particles within the air causes the particles to exit the cyclonic chamber through ducts, and the particles are separated in collection chambers.

Currently, there is a need for a compact cyclonic separation assembly for the treatment of swimming pool water, waste water, and oil. The desired system should employ centrifugal force to separate debris from a debris laden fluid. Importantly, the filter assembly should be capable of easy disassembly for cleaning and parts replacement, making the separator assembly inexpensive to maintain. It should also be capable of handling high fluid flow rates and rapid fluid processing and should provide significant pre-filtration prior to flow through sand filter elements, thereby eliminating the need for frequent back flushing of the sand filters and saving thousands of gallons of water.

The foregoing prior art documents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

DISCLOSURE OF INVENTION

The present invention is a multi-cyclone sediment filter that includes a sediment bowl with a hemispherical bottom and a sump therein for collecting sediment, a cylindrical cyclone housing disposed above and sealingly connected to the sediment bowl, a removable and replaceable cyclone cartridge inserted into the cyclone housing, a diffuser plate sealingly connected to the cyclone cartridge and cyclone housing, a fluid inlet for introducing fluid into the cyclone housing, and a fluid outlet for discharging fluid from the cyclone housing. The cyclone cartridge inserted in the cyclone housing includes a plurality of vertically disposed inverted cone-shaped fluid cyclones, each having a small opening at a lower end and larger opening at an upper end. The cartridge has a plurality of fluid flow paths that direct fluid to the cyclones where a vortex is induced in the moving fluid. As sediment is removed from the fluid in each cyclone, it is separated out and delivered down into the sediment bowl sump, while fluid is directed upwardly and out to the fluid outlet.

It is an object of the present invention to provide a new and improved multi-cyclone sediment filter that provides effective filtering for small or large applications for filtering swimming pool water, waste water, and oil.

It is another object of the present invention to provide a new and improved sediment filter that is easily repaired, maintained, cleaned, and serviced.

A further object or feature of the present invention is a new and improved filter apparatus well adapted for pre-filtering for in-place sand filters.

An even further object of the present invention is to provide a novel multi-cyclone sediment filter that includes a plurality of radially disposed cyclonic cones that allows for high fluid flows and rapid fluid processing.

Still another object of the present invention is to provide a multi-cyclone separator that eliminates the need for frequent back flushing of swimming pool sand filters, thus saving thousands of gallons of water.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the assembled multi-cyclone separator;

FIG. 2A is an exploded perspective view showing the lower portion of the apparatus.

DRAWING REFERENCE NUMERALS

Figure 1:
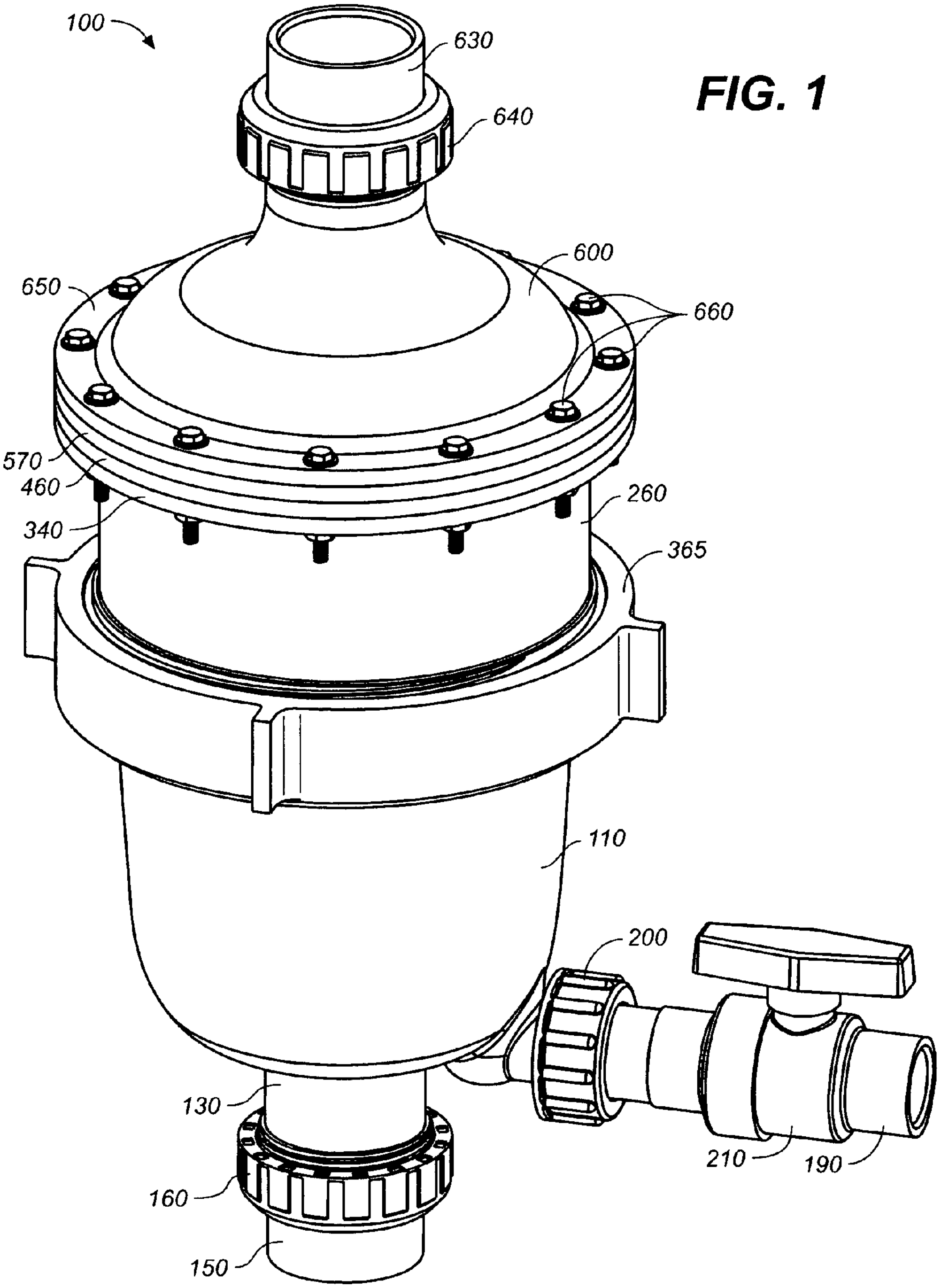
FIG. 1 is

100 inventive multi-cyclone sediment filter (generally)
110 sediment bowl
120 bottom portion of sediment bowl
130 fluid inlet
A central axis
140 threaded male end of fluid inlet tube
150 fluid source tube
160 locking collar
170 sediment bowl drain tube
180 threaded male end of sediment bowl drain tube
190 drain outlet pipe
200 locking collar
210 purge valve
220 particle bed
230 holes in particle bed
240 stand-offs
250 flange
260 cyclone housing
270 male threads
280 deck
290 sediment holes
300 fluid conduit
310 underside of deck
320 top side of deck
330 sealing ring
340 flange
350 annular groove
360 O-ring seal
365 locking collar
370 cyclone cartridge
380 fluid cyclones
390 cyclone cartridge inlet tube
400 flared upper end of cyclone cartridge inlet tube
410 vortex openings
420 vortex channels
430 vortex ports
440 O-ring seal

450 annular groove
460 flange
470 O-ring
480 annular groove
490 annular groove
500 O-ring seal
510 diffuser (manifold) plate
520 vortex (diffuser) tubes
530 through holes
540 space above diffuser plate
550 center hole
560 diverter cone
570 outer (flange) portion
580 annular groove
590 O-ring seal
600 cap
610 cap neck
620 threaded male end of neck
630 fluid outlet pipe
640 locking ring
650 flange
660 bolts

BEST MODE FOR CARRYING OUT THE INVENTION

Figure 2A:
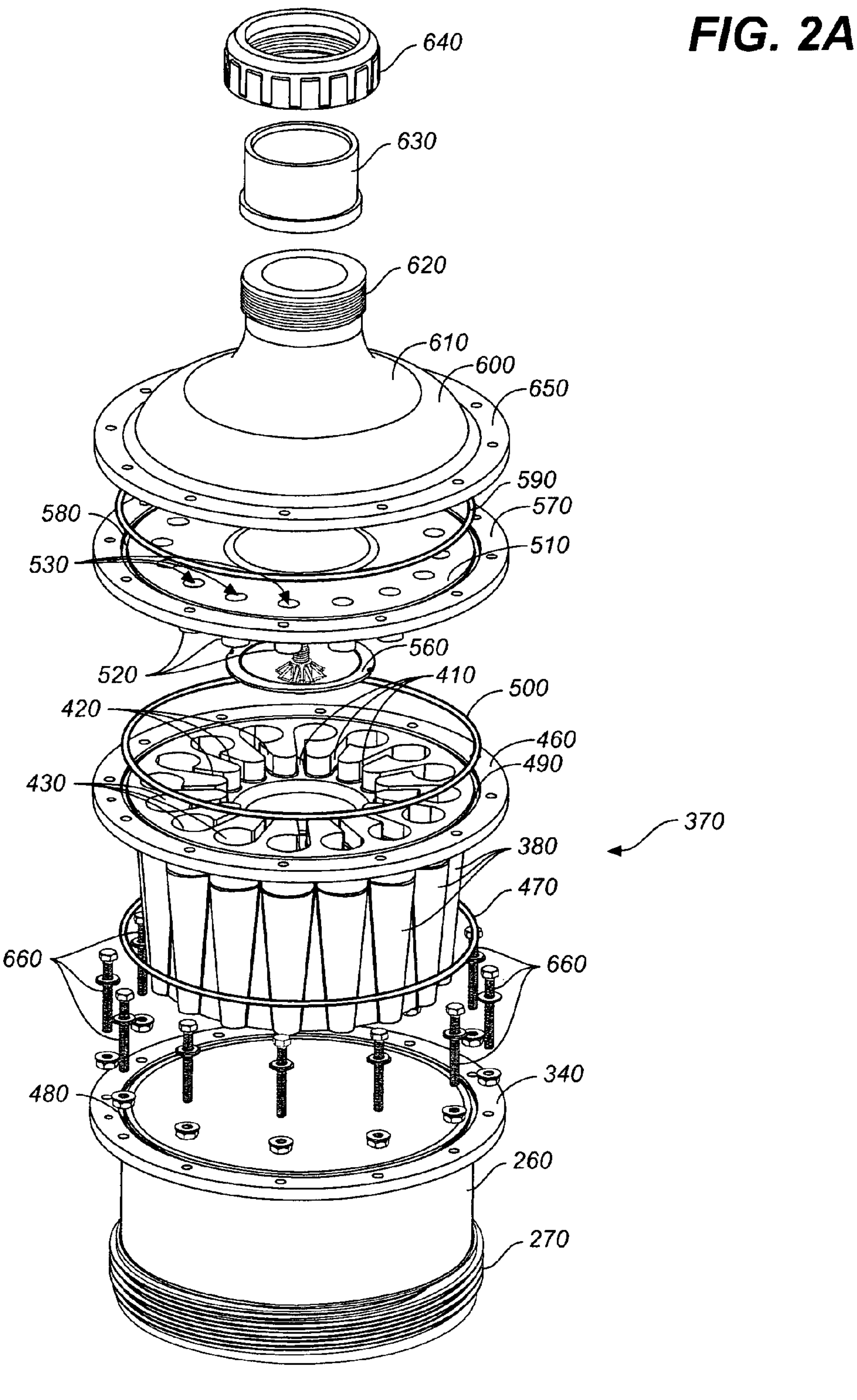
FIG. 2A is an exploded perspective view of the upper portion of the multi-cyclone separator.
Figure 2B:
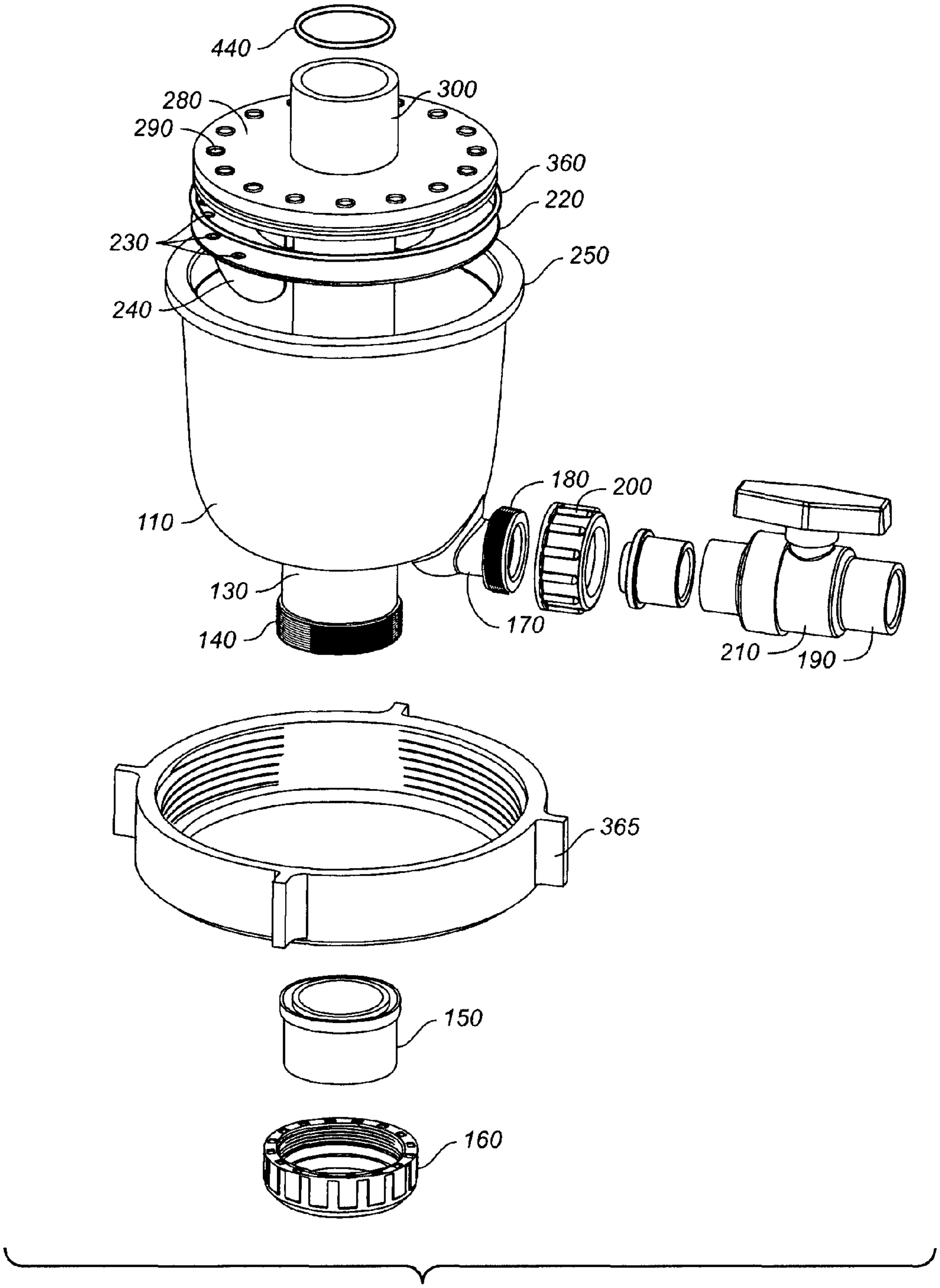
Figure 3:
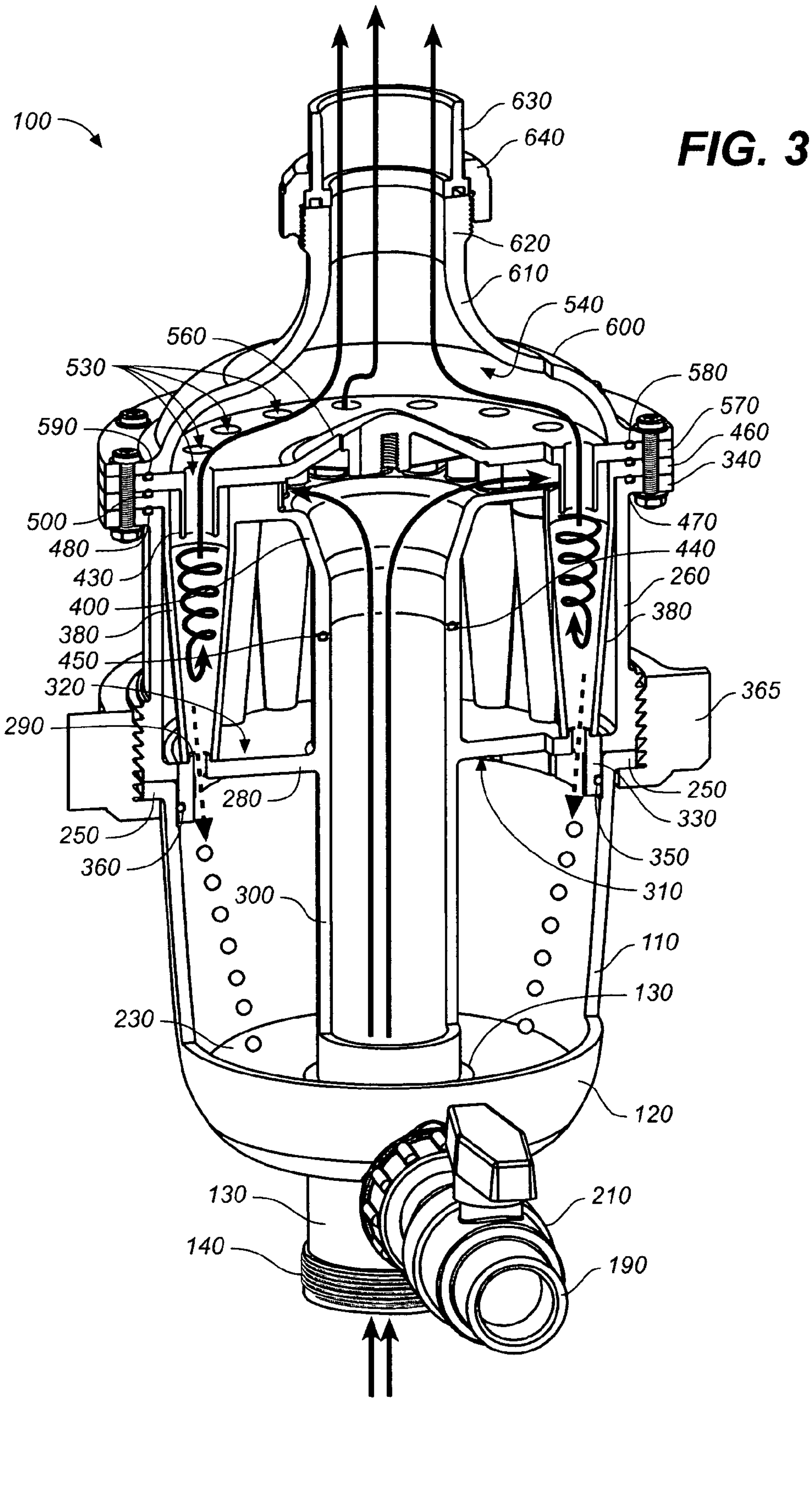
FIG. 3 is a cross-sectional perspective view of the inventive multi-cyclone separator showing the fluid flow paths.

Referring to FIGS. 1 through 3, wherein like reference numerals refer to like components in the various views, there is illustrated therein a new and improved multi-cyclone separator or sediment filter, generally denominated 100 herein. Collectively these views show that the inventive apparatus comprises a lower sediment bowl 110 having a hemispherical bottom portion, or sump, 120, with a fluid inlet 130, preferably a tube axially disposed on the central axis A through the bottom. The fluid inlet includes a threaded male end 140 which is connected to a pressurized fluid source through a fluid source tube 150 via a locking collar 160 having female threads complementary to the male end of the fluid inlet tube.

Extending radially from the bottom portion of the sediment bowl is a sediment bowl drain tube 170 having a threaded male end 180 for connection to a drain outlet pipe 190 via a locking collar 200. The drain outlet pipe preferably includes a purge valve 210 for selective draining of the sediment bowl.

A generally planar and annular particle bed 220 is placed at the bottom of the sediment bowl and includes a plurality of holes 230 that allow the finest sediment to settle into the bottom of the sediment bowl while restricting passage of larger particulate material. The particle bed is stabilized by one or more stand-offs 240 disposed on the underside of the particle bed.

The upper edge of the sediment bowl includes an outwardly extending flange or rim 250.

The second major element in the inventive apparatus is a cylindrical cyclone housing 260 having male threads 270 on its exterior lower end 270, floor or deck 280 having a plurality of sediment holes 290, an integrally formed fluid conduit 300 extending downwardly from the underside 310 of the deck and upwardly from the top side 320 of the deck, a sealing ring 330 integral with the underside of the deck and sized with an exterior circumferential diameter to fit tightly against the interior side of the upper portion of the sediment bowl, and a flange 340 extending outwardly from its upper edge. The sealing ring includes an exterior annular groove 350 in which an O-ring seal 360 is disposed.

The sediment bowl and cyclone housing are connected by inserting the sealing ring 330 into the upper portion of the sediment bowl so that the outermost portion of the underside of the deck 310 is seated upon the flange or rim 250 of the sediment bowl. A threaded locking collar 365 is then screwed onto the exposed male threads of the cyclone housing. When this is done, the fluid conduit 300 is brought into fluid communication with, and into a tight sealed engagement with, the fluid inlet 130.

The multi-cyclone separator next includes a cyclone cartridge or magazine 370, a complex element comprising a plurality of vertically disposed inverted conical fluid cyclones 380 having open upper and lower ends, the latter having the smaller openings. The central portion of the cyclone cartridge includes a cyclone cartridge inlet tube 390 brought into axial alignment with the fluid conduit 300 in the assembled apparatus. The cyclone cartridge inlet tube 390 includes a flared upper end 400 that encourages water under pressure and high velocity to move to a plurality of vortex openings 410 and through vortex channels 420 which extend to circular vortex ports 430 in fluid communication with the open upper ends of the inverted conical fluid cyclones 380. An O-ring seal 440 is disposed in an annular groove 450 in the upper end of the fluid conduit to complete the seal with the cyclone cartridge inlet tube.

The upper edge of the cyclone cartridge includes an outwardly extending flange 460 that is seated upon the flange 340 of the cyclone housing 260, and a seal is formed by an O-ring 470 disposed in an annular groove 480 in the upper surface of flange 340. The flange 460 of the cyclone cartridge also includes an annular groove 490 into which an O-ring seal 500 is placed.

The sediment filter and multi-cyclone separator of the present invention next includes a generally planar diffuser plate, or manifold plate, 510, having a plurality of diffuser tubes (vortex tubes) 520 extending downwardly from its underside, each tube inserted into the upper portion of the conical cyclones, the diffuser tubes having an outer diameter less than that of the upper diameter of the open upper end of the cyclones. Through holes 530 penetrating the diffuser plate bring the diffuser tubes and the cyclones into fluid communication with the space 540 above the diffuser plate. A center hole 550 in the diffuser plate accommodates a diverter cone 560 which directs fluid flowing over it up and away from the diffuser plate. When the diffuser plate is placed over the cyclone cartridge, it creates a ceiling over the cyclone cartridge and restricts fluid flow paths through the cyclone cartridge, cooperating with the cyclone cartridge structure to create a manifold. The resultant structure limits the available flow path from the cartridge fluid inlet through cyclone cartridge to that of the many vortex openings 410, the vortex channels 420, and the vortex ports 430 to the fluid cyclones 380, where sediment separation takes place during system operation.

The outer (flange) portion 570 of the diffuser plate has a circumference substantially the same as that of the cyclone housing flange 340 and the cyclone cartridge flange 460, such that on assembly it is seated atop the cyclone cartridge flange. It, too, includes an annular groove 580 for an O-ring seal 590.

Next, disposed atop the diffuser plate is a dome-shaped cap 600 having an axially disposed neck 610 that extends to a threaded male end 620 adapted for attachment to a fluid outlet pipe 630 through a locking ring 640. As with the elements disposed below the cap, the cap includes a flange portion or circumferential ring 650 that is dimensionally substantially identical to the inferior flange portions. Therefore, and as will be immediately appreciated by reference to the drawings, the multi-cyclone housing, the cyclone cartridge, the diffuser plate 510, and the cap 600 are secured to one another by bolts 660 that pass through aligned apertures in each of the flange portions of the elements, in a manner well known in the art. Additionally, it is the dome shaped cap 600 that creates the open space 540 through which fluid flows after leaving the fluid cyclones in the cyclone cartridge and before exiting the filter through the fluid outlet 630.

Referring now to FIG. 3, arrows show the flow path of fluid into, through, and out from the multi-cyclone separator of the present invention. Fluid is introduced through the fluid inlet tube 130 from a pressurized source, such as a pump. The water continues up the fluid conduit 300 and then into and through the cyclone cartridge inlet tube 400. As it reaches the flared upper portion of the cyclone cartridge inlet tube, the fluid flows outwardly, where it is further diverted by engagement with the structural elements of the cyclone cartridge 370, which creates restricted flow paths sending the fluid through the vortex inlets 410, vortex channels 420, and vortex ports 430, where the fluid is then directed into the sides of the open upper ends of the cyclones 380 and around the vortex tubes 520 partially extending into the cyclones. With this fluid path, fluid under constant pressure and continuous flow induces a fluid vortex in the cyclones. The vortex spins heavy sediment particles outwardly through centrifugal force, which then drop downwardly under the influence of gravity to the bottom of the cyclone and through the bottom openings in the cyclones. The difference in size between the available outlets in the cyclones creates a pressure differential from top to bottom, and in contrast to heavy particles, the fluid proceeds upwardly through the diffuser plate holes 530 and finally out the fluid outlet 630. The sediment continues to fall where and eventually collects in the sump at the bottom portion of the sediment bowl.

The present invention reduces backwashing, extends filter cartridge life, obviates the need to clean or replace filter media, and is extremely simple to clean. The present invention requires little or no maintenance, as there are no moving parts to fail or wear out, or filter media to clean or replace. The accumulation of sediment can be visibly monitored through a transparent sediment sump. The sediment is simply discharged by opening the purge valve. Only a small amount of water is discharged to purge the filter of sediment. Thus, the multi-cyclone is perfectly suited for pre-filtration to extend the filtration cycle of an existing filter. In trials, it was shown that the multi cyclone will filter approximately 75% of the incoming sediment from a typical residential swimming pool.

Most importantly, the inventive apparatus provides a way for rapid parts replacement and maintenance, particularly with respect to the cyclone cartridge or magazine 370, the signal element in the system. This is accomplished by disconnecting the fluid outlet and then removing the bolts 650 securing the filter elements in a stacked sandwich configuration. The cyclone cartridge can simply be lifted out from the cyclone housing 260 and replaced with a new cyclone magazine while the removed cartridge can be cleaned, reconditioned, or simply discarded.

However, in its most essential aspect, the inventive multi-cyclone sediment filter comprises a sediment bowl for collecting sediment; a cyclone housing disposed above and sealingly connected to the sediment bowl; a removable cyclone cartridge disposed in the cyclone housing, which includes a plurality of conically shaped fluid cyclones, each having a small opening at a lower end and larger opening at an upper end, and further including a plurality of fluid flow paths through the cyclone cartridge to the cyclones. A fluid inlet in fluid communication with the cyclone housing introduces fluid under pressure into the cyclone housing for passage through the flow paths in the cyclone cartridge and to the fluid cyclones. Finally, a fluid outlet in fluid communication with the cyclone housing allows filtered fluids to be discharged from the cyclone cartridge while the sediments removed drop down into the sediment bowl.

The foregoing disclosure is sufficient to enable those with skill in the relevant art to practice the invention without undue experimentation. The disclosure further provides the best mode of practicing the invention now contemplated by the inventor.

While the particular fluid filtering apparatus shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. It will be appreciated, for instance, that the fluid inlet path need not come from directly underneath the sediment bowl. Indeed, any of a number of fluid inlet paths could be employed, as long as the fluid is delivered into the cyclone housing and cyclone cartridge in such a way as to ensure distribution through cartridge into the multiple cyclones. Thus, the fluid inlet tube could be disposed through the side of the sediment bowl, or even through the side of the cyclone housing, though this latter path would slightly compromise the symmetry of the cyclone cartridge.

Further, it will be appreciated that alternative attachment means could be employed for securing the structural elements in the stacked configuration described and illustrated. For instance, rather than using a plurality of bolts passing through similarly sized flanges, additional threaded locking collars could be employed. While this would not be the most elegant arrangement of structures in a small filter adapted for use in swimming pool filtering, larger filters might employ such means advantageously.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A multi-cyclone sediment filter for filtering water and oil, comprising:

a sediment bowl for collecting sediment;

a cyclone housing disposed above and sealingly connected to said sediment bowl;

a cyclone cartridge disposed in said cyclone housing, said cyclone cartridge including a plurality of conically shaped fluid cyclones, each having a small opening at a lower end and larger opening at an upper end, and further including a plurality of fluid flow paths through said cyclone cartridge to said plurality of fluid cyclones;

a fluid inlet in fluid communication with said cyclone housing for introducing water or oil into said cyclone housing and for passage through said cyclone cartridge;

a fluid outlet in fluid communication with said cyclone housing for discharging water or oil from said cyclone cartridge; and a diffuser plate sealingly connected to said cyclone cartridge and said cyclone housing, said diffuser plate including a plurality of diffuser tubes, each of which extends downwardly into an upper open portion of one of said fluid cyclones in said plurality of fluid cyclones, and a center hole accommodating a diverter cone for directing water or oil flowing over said diverter cone up and away from said diffuser plate.

2. The multi-cyclone sediment filter of claim 1, wherein said sediment bowl includes a sump for the collection of sediment separated from water or oil passing through said apparatus.

3. The multi-cyclone sediment filter of claim 1, wherein said sediment bowl includes a bottom portion and said fluid inlet is a tube disposed through the bottom of said sediment bowl and is connected to a source of water or oil under pressure.

4. The multi-cyclone sediment filter of claim 1, further including a sediment bowl drain having a valve for selective draining of said sediment bowl.

5. The multi-cyclone sediment filter of claim 1, further including a fluid conduit in fluid communication with said fluid inlet, and wherein said plurality of conically shaped fluid cyclones are vertically disposed and inverted in said cyclone cartridge, and said cyclone cartridge further includes a central portion having a cyclone cartridge inlet tube in axial alignment with said fluid conduit, and wherein each of said fluid flow paths in said plurality of fluid flow paths in said cyclone cartridge includes a vortex opening, a vortex channel, and a vortex port, each in fluid communication with the open upper ends of one of said fluid cyclones in said plurality of fluid cyclones.

6. The apparatus multi-cyclone sediment filter of claim 1, wherein said diffuser tubes have an outer diameter less than that of the upper diameter of said fluid cyclones.

7. The multi-cyclone sediment filter of claim 6, wherein each of said diffuser tubes includes a through hole penetrating said diffuser plate and bringing said fluid cyclones into fluid communication with a space above said diffuser plate.

8. The multi-cyclone sediment filter of claim 7, wherein said diffuser plate is substantially circular and planar, and wherein said diverter cone is disposed in the center of said diffuser plate.

9. The multi-cyclone sediment filter of claim 1, further including a cap sealingly connected to said diffuser plate and creating a space between said cap and said diffuser plate.

10. The multi-cyclone sediment filter of claim 9, wherein said fluid outlet is in fluid communication with the space between said cap and said diffuser plate.

* * * * *

UNITED STATES PATENT AND TRADEMARK OFFICE

CERTIFICATE OF CORRECTION

PATENT NO. : 8,348,064 B2
APPLICATION NO. : 12/665299
DATED : January 8, 2013
INVENTOR(S) : Tandon et al.

It is certified that error appears in the above-identified patent and that said Letters Patent is hereby corrected as shown below:

On the title page item [75], insert --Kenneth Cleine--

Signed and Sealed this
Seventeenth Day of May, 2016

Michelle K. Lee
*Director of the United States Patent and Trademark Office*